United States Patent [19]

Liu et al.

[11] Patent Number: 5,377,026
[45] Date of Patent: Dec. 27, 1994

[54] MODULATOR USING THE LINEAR ELECTRO-OPTIC EFFECT OF LIQUID CRYSTALS

[76] Inventors: Jian-Yu Liu, 4395 Grinnell Ave., Boulder, Colo. 80303; Kristina M. Johnson, 4 Tall Pine La., Boulder, Colo. 80302; Michael G. Robinson, 1 Brookhampton Cottages, Newington Road, Stadhampton, Oxon OX9 7UU, United Kingdom

[21] Appl. No.: 938,997

[22] Filed: Sep. 2, 1992

[51] Int. Cl.$^5$ ............... G02F 1/1335; G02F 1/1343; G02F 1/137; G02F 1/13
[52] U.S. Cl. ........................................ 359/40; 359/42; 359/56; 359/94; 359/100
[58] Field of Search ............... 359/40, 42, 56, 94, 359/100

[56] References Cited

U.S. PATENT DOCUMENTS

| | | | |
|---|---|---|---|
| 4,232,948 | 11/1980 | Shanks | 359/53 |
| 4,367,924 | 1/1983 | Clark et al. | 359/100 |
| 4,563,059 | 1/1986 | Clark et al. | 359/100 |
| 4,790,634 | 12/1988 | Miller et al. | 359/71 |
| 4,813,771 | 3/1989 | Handschy et al. | 359/42 |

FOREIGN PATENT DOCUMENTS

| | | |
|---|---|---|
| 2238200 | 7/1974 | France. |
| 9009614 | 8/1990 | WIPO. |

OTHER PUBLICATIONS

J. Y. Liu et al., "Second-harmonic generation in ferroelectric liquid crystals," Opt. Lett., 15, No. 5 Mar. 1, 1990, pp. 267–269.
J. Y. Liu et al., "Ferroelectric liquid–crystal waveguiding structures for nonlinear optics applications," OSA Annual Meeting, Tech. Dig. (Nov. 1990) TuZ2.
J. Y. Liu et al., "Novel Ferroelectric Liquid Crystal Materials for Second Order NLO," Proc. Int. Symp. Nonlinear Optical Materials, El Paso, Tex., Oct. 1990.
Sharp et al. "Smectic Liquid Crystal Tunable Filters" Ferroelectrics (1991), vol. 114, pp. 55–69.
Masterson et al., "Ferroelectric Liquid–crystal Tunable Filter", Optics Letters, vol. 14, No. 22 (1989) pp. 1249–1251.
Andersson et al. "Device Physics of the Soft Mode Electro–optic Effect", J. Appl. Phys. vol. 66, No. 10 (Nov. 1989), pp. 4983–4995.
Funfschilling et al. "Fast Responding ... Displays", J. Appl. Phys. vol. 66, No. 8 (Oct. 1989), pp. 3877–3882.
Sharp et al. "Continuously Tunable Smectic A* Liquid Crystal Color Filter", Optics Letters vol. 15, No. 10, (May 1990), pp. 523–525.
Bata et al. "Dielectric Properties of Nematic and Smectic Liquid Crystals", Adv. Liq Cryst. Res. Appl., (1980), pp. 251–260.

(List continued on next page.)

*Primary Examiner*—Anita Pellman Gross
*Assistant Examiner*—Ron Trice

[57] ABSTRACT

This invention provides an electro-optic modulator which, in some embodiments, utilizes the linear electro-optic effect in liquid crystal materials. The liquid crystal modulator of this invention comprises a chiral smectic liquid crystal cell with electrodes to supply an electric field in a direction with a nonzero linear electro-optic coefficient, and means to suppress change in the tilt angle and azimuthal angle of the liquid crystal molecular directors. The response time of the linear electro-optic effect modulators of this invention is in the nanosecond range or faster. This modulator can be employed in Fabry-Perot or waveguide devices to provide increased modulation via multiple passes. This invention further provides for prism-coupling of light into or out of the waveguide structure whereby the modulator provides amplitude modulation, tunable filtering, or both. The prism-coupled waveguide filter is further provided for any electro-optic material, not limited to liquid crystals, and any electro-optic modulation mechanism, not limited to the linear electro-optic effect.

13 Claims, 8 Drawing Sheets

OTHER PUBLICATIONS

Buka et al. "Dielectric Permittivity . . . Dobhap", Adv. Liquid-crystl. Res. Appl., (1980) pp. 261–266.

Maruyama, "Electric Field Effects . . . DOBAMBC" Ferroelectrics, vol. 58, (1984), pp. 187–192.

Gouda et al. "Dielectric Studies . . . Ferroelectric Liquid Crystals", Ferroelectrics vol. 113, (1991), pp. 165–206.

Walba et al. "Design of Ferroelectric . . . NLO Applications", J. Amer. Chem. Soc., vol. 113, (1991), pp. 5471–5479.

Tien et al. "Theory of Prism-Film Coupler and Thin Film Light Guides", J. Opt. Soc. Amer. vol. 60, No. 10, Oct. 1970, pp. 1325–1327.

Ulrich et al. "Measurement of Thin Film Parameters with a Prism Coupler", Applied Optics, vol. 12, No. 12, Dec. 1973, pp. 2901–2908.

Bawa et al. "Miniaturized total reflection ferroelectric liquid crystal electro-optic switch", Appl. Phys. Lett., vol. 57, No. 15, Oct. 8, 1990, pp. 1479–1481.

Liu et al. "Measurement . . . Materials", Technical Digest, vol. 15, Sep. 4, 1991, pp. 226–229.

MODULATOR USING THE LINEAR ELECTRO-OPTIC EFFECT OF LIQUID CRYSTALS

FIELD OF THE INVENTION

This invention relates to linear electro-optic modulation in liquid crystal devices, in particular Fabry-Perot and prism-coupled waveguide devices, and to electro-optically tunable prism-coupled waveguide filters.

BACKGROUND OF THE INVENTION

There are several research territories which contribute to the prior art of the present invention. They include liquid crystal electro-optic modulation, the dielectric properties of liquid crystals, second-order nonlinear optical effects, and prism-coupled waveguides. Each is discussed below.

Liquid crystal electro-optic modulation has been utilized in a number of device applications. Nematic liquid crystals provide analog retardation changes due to rotation of birefringent molecules out of the plane of the incident optical field with tuning speeds of 1–100 ms. Chiral smectic liquid crystals (CSLCs) provide tuning speeds of 1 $\mu$s. When incorporated in a "bookshelf" geometry cell (smectic layers oriented perpendicular to the substrate walls), analog CSLC materials, such as SmA* (S. T. Lagerwall et al. in U.S. Pat. No. 4,838,663) and distorted helix ferroelectrics, DHF (L. A. Beresnev et al., European Patent Application No. 309774, published 1989), display an analog tilt of the cell optical axis in the plane of the cell walls upon application of an electric field across the smectic layers. In a discrete, multi-state cell, for example using ferroelectric SmC* or SmH* (N. A. Clark et al. in U.S. Pat. No. 4,367,924 and U.S. Pat. No. 4,563,059) or antiferroelectric phases (see for example, I. Nishiyama et al., Jpn. J. Appl. Phys. 28, L2248 (1989)), application of an electric field above a certain threshold voltage results in switching of the tilt of the CSLC molecules between discrete stable states. In homeotropically aligned cells (smectic layers parallel to substrate walls) the optical axis of the CSLC material rotates in a plane perpendicular to the cell walls on application of an electric field across the smectic layers by electrodes that are lateral to the substrate walls (Sharp et al., U.S. patent application 07/792,284 filed Nov. 14, 1991 and S. Garoff et al. Phys. Rev. Lett. 38, 848 (1977)). The devices of the prior art of nematic liquid crystal cell and CSLCs all function by large molecular reorientation of the molecular director (a vector on the long molecular axis).

The dielectric properties of liquid crystals have been characterized by a number of groups (L. Bata et al., in *Advances in Liquid Crystal Research and Applications*, edited by L. Bata, Pergamon Press (Oxford) 1980, p. 251; A. Buka, ibid. p. 261; N. Maruyama, Ferroelectrics 58, 187 (1984); and F. Gouda et al., Ferroelectrics 113, 165 (1991)). The modes utilized in the prior art of liquid crystal devices, which are associated with reorientation of the molecular director, are identified in CSLCs as the Goldstone mode (azimuthal fluctuation of the molecular director) and the "soft" mode (fluctuation of the tilt angle). Typical frequencies for these modes are 10–100 Hz and $10^4$–$10^5$ Hz respectively. Both modes are present in SmC* materials and only the soft mode is present in SmA* materials. Other contributions to the dielectric permittivity are identified as rotation about the molecular short axis, reorientation about the short-axis, rotation about the long axis, and intramolecular rotation about a single bond. These modes occur at higher frequencies ($10^6$–$10^{12}$ Hz) than the molecular reorientation modes. At still higher frequency is electronic oscillation.

Optical second-order nonlinear ($X^2$) effects include second harmonic generation (SHG), the linear electro-optic (EO) effect (Pockels effect), parametric amplification, optical rectification, and frequency mixing (see, for example, A. Yariv, *Optical Electronics* 3rd ed., CBS College Publisher, 1985). The origin of these nonlinear processes is field-induced displacement of the centers of positive and negative charged matter. In the linear EO effect, an applied electric field alters the index of refraction of the medium. This affords a convenient and widely used means of modulating the phase or intensity of optical radiation. Applications of the linear EO effect include optical modulation, spectral filters, and beam deflectors.

In the prior art, second-order nonlinear optical effects have been demonstrated in inorganic crystals and in organic materials such as Langmuir-Blodgett films, polymeric solid solutions, main chain polymers, and side chain polymers (T. Kondo et al., Jpn. J. Appl. Phys. 28, 1622 (1989) and D. Jungbaver et al., J. Appl. Phys. 69, 8011 (1991)). Chiral smectic liquid crystals in the thermodynamically stable smectic C* phase have $C_2$ polar symmetry and possess macroscopic order, the requirements for displaying nonlinear optical effects. The inventors have previously demonstrated second harmonic generation with CSLCs (J. Y. Liu et al., Opt. Lett. 15, 267 (1990) and J. Y. Liu, Ph.D. Thesis, University of Colorado, 1992). In addition, discovering the molecular criteria for CSLCs with increased nonlinear optical response and synthesizing such compounds has been undertaken (D. M. Walba et al., Mol. Cryst. Liq. Cryst. 198, 51 (1991) and J. Am. Chem Soc. 113, 5471 (1991)).

A technique is presented in the prior art for sensitive measurements of dielectric materials using prism-coupled thin-film waveguides (P. K. Tien et al., J. Opt. Soc. Am. 60, 1325 (1970) and R. Ulrich et al., Appl. Opt. 12, 2901 (1973)). Prism-coupling provides an efficient method of coupling a light beam into a thin film waveguide. In this technique a high refractive index prism is placed above a thin-film waveguide, separated by a low index cladding layer. For efficient coupling, the components of the wave vectors parallel to the gap are equal in the prism and the waveguide. This device has been demonstrated with inorganic thin-films.

Waveguides have been constructed with both nematic and smectic liquid crystal materials (M. Kobayashi et al., IEEE J. Quantum Elect. OE-18, 1603, 1982; T. G. Giallorenzi et al., J. Appl. Phys. 47, 1820, 1976; and S. S. Bawa et al., Appl. Phys. lett. 57, 1479, 1990). These devices utilize refractive index changes due to molecular reorientation to provide phase retardation. Some of these devices use prisms to couple monochromatic incident light into a polymer waveguide, which in turn is coupled into a liquid crystal waveguide. This technique is distinct from prism coupling directly into the waveguide in that modulating the liquid crystal waveguide refractive index does not affect the coupling condition at the prism-polymer waveguide interface. Liquid crystals have also been used in tunable Fabry-Perot filters (see, for example, M. W. Maeda et al. IEEE Photonics Tech. Lett. 2, 820 (1990) and A. Miller et al., U.S. Pat. No. 4,790,634) but, as in the case of liquid crystal waveguides, they utilize molecular reorientation for modulation.

SUMMARY OF THE INVENTION

The present invention provides an electro-optic modulator, which, in some embodiments, utilizes the linear electro-optic effect in liquid crystal materials. In the prior art, liquid crystal electro-optic modulators operate by large molecular reorientation of the azimuthal or tilt angle of the molecular director in response to an applied electric field. This leads to microsecond response times. In the present invention subnanosecond response times are provided by use of the linear electro-optic effect.

The linear electro-optic effect results from the redistribution of bound charges in a dielectric medium to produce a change $\Delta n$ in the refractive index in response to an applied field $E_j$ according to the relationship $\Delta n_i \alpha r_{ij} E_j$, where $r_{ij}$ is the linear electro-optic coefficient. In order to have a nonzero $r_{ij}$, the medium is required to have macroscopic order and noncentrosymmetric symmetry. This requirement is met by some liquid crystal materials, including chiral smectic C* liquid crystals. Additional contributions to the dielectric response from rotation about the molecular long axis, reorientation about the short axis, and intramolecular rotation increase the electro-optic coefficient of chiral smectic liquid crystals beyond the effect of electronic oscillations alone.

In order to utilize the linear electro-optic effect in preference to changes in the azimuthal or tilt angle, the modulators of the present invention provide a means for restricting change in the orientation of the molecular director. This can be accomplished by switching the applied field $E_j$ at a frequency greater than the response time for reorientation of the molecular director, or by applying a bias field $E_B$ to fix the molecular director position.

One embodiment of the modulators of the present invention employs a Fabry-Perot cavity to provide multiple optical passes through the liquid crystal and thereby increase the interaction length with the light. This device comprises a liquid crystal cell with electrodes for applying $E_j$ and $E_B$ placed between two partially or completely reflective surfaces. The Fabry-Perot resonance condition requires that an integral number of wavelengths be equal to the round trip optical path length of the cavity. As a modulator for monochromatic light, linear electro-optic switching of the refractive index changes the cavity resonance condition and thereby produces intensity modulations of the output beam. When utilized with a plurality of input wavelengths, the change in the cavity resonance condition changes which wavelength of light is output, thus providing a tunable filter. In reflection mode it provides a phase modulator.

Another embodiment of the present invention uses a waveguide to provide multiple passes through the liquid crystal material. This device is comprised of cladding layers, with refractive indices less than that of the liquid crystal guiding layer, for confining light within the waveguide, and electrodes for applying $E_j$ and $E_B$. Light can be coupled into and out of either the ends of the guide or the sides. Side coupling can be achieved by abutting prisms with refractive indices greater than the guiding layer index.

The function provided by the waveguide modulator of this invention depends on which coupling is employed and on whether the input light is monochromatic or polychromatic. For end-coupling at both the input and output, the device of this invention provides phase and polarization modulation. When prism-coupling is employed at either the input or the output, or both, a coupling condition is imposed: the components of the wave vectors parallel to the gap must be equal in the prism and the guiding layer. Satisfying this coupling condition is dependent on the wavelength of light, the angle of the beam in the prism, the order of the waveguide mode, and the refractive index of the guiding layer.

For monochromatic light the waveguide modulators with side in, end-out coupling and with side-in, side-out coupling are intensity modulators. The end-in, side-out device modulates the angle of the output beam, which, at a fixed point of observation, is equivalent to an intensity modulation. An additional feature of the waveguide device is the ability to select the thickness of the guiding layer to determine the number of waveguide modes for each wavelength. Thus a single input beam can produce of number of simultaneously modulated output beams. When output coupling prisms are placed on both sides of the waveguide, output beams are provided in both the reflected and the transmitted directions.

For polychromatic input light, the waveguide structure with at least one prism coupling is a tunable filter. When polychromatic light is end-fired into the waveguide all the wavelengths enter the guiding layer. At each wavelength the coupling condition at the output prism is satisfied at a different beam angle and thus the wavelengths are spatially dispersed. Tuning the refractive index of the guiding layer tunes the output angles. From a fixed observation angle the device thus provides tunable filtering of the polychromatic input light.

When polychromatic light is prism-coupled into the side of the waveguide tunable filter of this invention, the wavelength which satisfies the coupling condition enters the guiding layer and the other wavelengths are reflected. The guided wavelength can be output at the end or through another coupling prism. Tuning the refractive index of the guiding layer tunes the wavelength which is coupled into the waveguide, thus providing a tunable filter.

The waveguide tunable filter with a prism-coupled input can be cascaded to provide simultaneous tuning and switching of multiple wavelengths. The wavelengths which are not coupled into each filter stage and which are reflected at the waveguide interface are input into the next filter stage, wherein the refractive index of the guiding layer is tuned to couple in one of these wavelengths and reflect the others. The cascaded filters of this invention have particular utility in demultiplexing multiple channels of optical communications systems.

The prism-coupled waveguide tunable filter of this invention can be implemented with any electro-optic material, not limited to liquid crystals, and with any electro-optic process, not limited to the linear electro-optic effect.

DETAILED DESCRIPTION OF THE INVENTION

Figure 1:
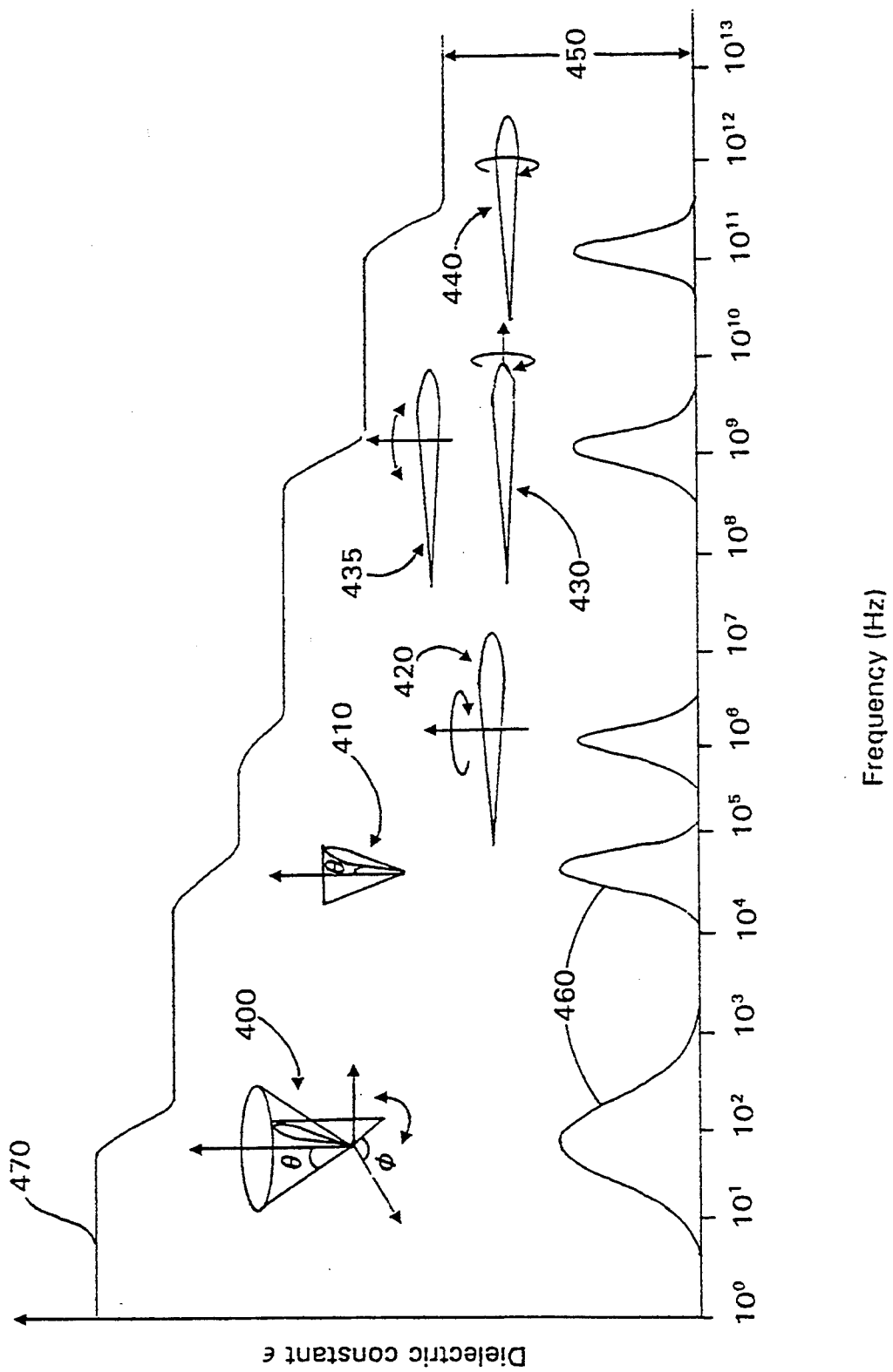
FIG. 1 shows the dielectric constant of a chiral smectic liquid crystal as a function of modulation frequency.

Conventionally, the electro-optic effects in chiral smectic liquid crystals involve large molecular reorientation, which leads to nominally microsecond response time. This invention, however, focuses on electro-optic modulation arising from excitations in the electronic structure and molecular rotations that occur on the nanosecond or faster time scale ($\geq$ GHz).

The linear electro-optic effect (Pockels effect) is so named because it refers to a linear change in refractive index with applied electric field, although it is, in fact, a second-order nonlinear $X^2$ process. Second harmonic generation, another $X^2$ process, has been previously demonstrated by the inventors (J. Y. Liu, Ph.D. Thesis) with the chiral smectic liquid crystal BDH SCE9 (British Drug House). A nonlinear susceptibility of $d_{23}=0.07$ pm/V was obtained. The linear electro-optic coefficients $r_{ij}$ can be determined from the nonlinear susceptibility tensor from the relationship $$r_{ij} = \frac{-1}{n^4} d_{ji} \qquad (1)$$

where n is the index of refraction. For liquid crystals n is approximately 1.5 so the expected EO coefficient is $r_{32}=0.01$ pm/V. Measurements with the modulator of the present invention, described in detail below, show that the electrooptic coefficient for BDH SCE9 is $r_{32}=3.6$ pm/V, which is two orders of magnitude larger than the value expected from Eq. 1.

Second harmonic generation operates at optical frequencies and therefore involves purely electronic oscillations. To explain the discrepancy between $r_{ij}$ and $d_{ji}$, possible additional contributions to the dielectric constant within the GHZ operating frequency range of the linear EO modulators of the present invention are considered.

The dielectric behavior of the liquid crystal materials has been widely studied and recently different contributions to the dielectric permittivity in CSLCs have been plotted. The results of the prior art (Gouda, op. cit. and Buka, op. cit.) are combined in FIG. 1 to show the frequency dependence of the complex dielectric permittivity.

Referring to the drawings, like numbers represent like elements and the same number appearing in more than one drawing represents the same element.

In FIG. 1 the dielectric constant 470 is shown as a function of frequency. Also shown are the modes contributing to the dielectric constant 400–450 and the frequencies of optical absorption 460 associated with these modes. The Goldstone mode 400, which refers to fluctuation of the azimuthal angle ψ, around the cone angle Θ, has a relaxation frequency in the range 10–500 Hz. The soft mode 410, connected to the tilt-angle fluctuation Θ, has a relaxation frequency in the range $10^3$–$10^6$ Hz and is in general strongly temperature dependent. Molecular rotation about the short axis 420 has a relaxation frequency of $10^6$ Hz. Molecular rotation about the long axis 430 and reorientation about the short axis 435 have relaxation frequencies of $10^9$ Hz. Intramolecular rotation about a single bond 440 is at $10^{11}$ Hz. Electronic oscillation 450 is the only contributor at higher frequencies. Within the GHz operation frequency of the liquid crystal linear EO device of this invention, molecular rotation about the long axis, reorientation about the short axis, and intramolecular rotation can contribute to the dielectric response. These molecular motions are the probable source of the increased linear EO effect beyond what is predicted by the previous SHG measurements. Rotation of molecules within an ordered medium is a motion unique to liquid crystals. This unexpected two orders-of-magnitude increased response is a significant feature of the present invention.

In the linear EO effect, application of an electric field $E_j$ changes the refractive index via coefficients $r_{ij}$. For chiral smectic C*liquid crystals, belonging to the point group $C_2$, in the presence of an external field $E_y$ the refractive index does not change in the y direction. The induced refractive index change in the orthogonal directions can be expressed by $$\Delta n_x = \frac{n_x^3 r_{12} E_y}{2}, \Delta n_z = \frac{n_z^3 r_{32} E_y}{2}. \qquad (2)$$

This induced index of refraction change, Δn, is typically small. For instance, if n=1.6, $r_{ij}\approx 1$ pm/V, and $E_j$=10 V/μm, then Δn=2.0×$10^{-5}$.

There are other smectic liquid crystal materials which are, in the absence of an applied field, centrosymmetric and therefore not candidates for the linear EO effect. In the device of this invention, a bias field may be applied to materials such as SmA* and DHF to tilt the molecular directors and thereby break the centrosymmetry and make the electro-optic coefficients nonzero.

The modulator of this invention utilizes the linear electro-optic effect in a liquid crystal cell to provide high speed modulation. The term liquid crystal cell is used herein to refer to transparent or semi-transparent cells containing a liquid crystal material. Cells are typically formed of uniformly-spaced transparent or semi-transparent retaining walls of an inert substrate, such as glass or quartz. A conducting material is typically coated on the inside surface of the substrate walls to provide transparent, semi-transparent or reflecting electrodes. Alternatively, the cells can employ lateral electrodes. A composition of liquid crystal materials is inserted between the uniformly-spaced electrodes and, for some materials, a method of alignment of the liquid crystals is employed.

Figure 2:
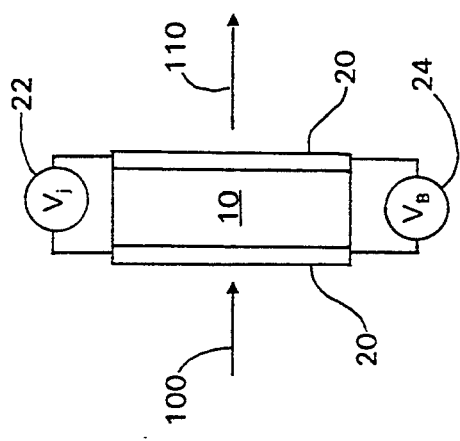
FIG. 2 illustrates a liquid crystal linear electro-optic modulator.

FIG. 2 shows the basic structure of the modulator of this invention, comprised of CSLC material 10, transparent or semi-transparent electrodes 20, and modulation voltage $V_j$ 22. In order to utilize the linear electro-optic effect, the much larger changes in refractive index due to changes in the tilt and azimuthal angles must be suppressed. This can be accomplished by modulating $V_j$ at a frequency greater than the approximately microsecond response time of molecular reorientation or by application of an optional bias voltage 24, $V_B$ to pin the molecular director orientation. Electrodes 20 can be positioned as shown or laterally to the liquid crystal layer to utilize particular electro-optic coefficients.

The bias voltage can serve an additional function of enabling the use of CSLC layers thicker than possible with surface stabilization techniques. In an ideal CSLC bookshelf geometry, where a high pretilt is introduced to the smectic layers, the directors remain everywhere parallel to the substrate surface, pointing along the z-axis when an electric field is applied. However, in a CSLC cell with chevron defects, the smectic layers bend inside the cell, and the CSLC molecules are no longer aligned uniformly. With an applied electric field, the spontaneous polarization of the CSLC is forced to follow the field, and a more uniform director distribution is achieved. Modulation of the chevron structure can form another type of EO modulation.

In the preceding discussion three applications were identified for the bias voltage $V_B$. The bias voltage functions by interacting with the polar portion of the liquid crystal molecules and rotating the molecular director. This can be used to pin the molecules in one orientation so that the modulation voltage $V_j$ induces only the linear EO effect and does not tilt the molecules. This function can be performed without the bias voltage by modulating $V_j$ at >MHZ frequency so that the molecular directors are, in effect, "pinned" by their slow response times. The bias voltage can serve a second function of introducing a tilt to a centrosymmetric crystal and breaking the symmetry. Thirdly, it can be used to correct the alignment in defective crystal structures. Additional functions are described in the following description.

Input light 100 receives a phase shift travelling through the modulator of FIG. 2. The phase shift in output light 110 is given by $$\Phi = k\Delta n l = \frac{\pi n^3 r_{ij} E_j l}{\lambda}, \tag{3}$$

where l is the optical path length, $\lambda$ is the wavelength in vacuo, and $k = 2\pi/\lambda$.

Two kinds of phase modulation methods are generally used to exploit this phase shift. In the first one, birefringent phase retardation, the modulator of FIG. 2 is placed between two crossed polarizers. Typically included in the optical path is a birefringent crystal that introduces a fixed retardation, so that the total retardation $\Phi$ is the sum of the retardation due to this crystal and the electrically induced one. The transmission through such a combination is modulated linearly by the applied electric field.

The second method, Mach-Zehnder interferometry, refers the modulated phase to the phase of an external interfering beam. This method requires a source coherence over the interfering length. The incoming polarized beam is split in two by a beamsplitter, one of the two beams is phase retarded by the modulator of FIG. 2, and the beams are recombined in a second beamsplitter. The interference of these beams produces an intensity modulation.

The amplitude modulation depth of the above techniques is limited by the short material interaction length. The embodiment of FIG. 3A incorporates the liquid crystal into a Fabry-Perot resonator. Applied voltage 26 incorporates both the modulation voltage and the optional bias voltage. Reflective surfaces 30 create a multipass cavity. The effective interaction length of the light beam with the CSLC is greatly increased by the multiple passes through the Fabry-Perot optical cavity. Thus, the modulation depth of the EO effect is enhanced.

In addition, the Fabry-Perot cavity imposes a resonance condition on the output beam 110 so that the device does not function as a pure phase modulator. The round trip phase shift $\Phi$ of light passing through the medium is $$\Phi = \frac{4\pi}{\lambda} n l \tag{4}$$

The Fabry-Perot resonance condition requires that the round trip phase delay equal an integral number m of optical cycles $$\Phi = m(2\pi), \tag{5}$$

for light to be transmitted. Using Eq. (4) for the phase delay in Eq. (5) gives as the Fabry-Perot resonance condition $$m\frac{\lambda}{n} = 2l \tag{6}$$

Light which does not satisfy this condition is reflected back toward the source.

Figure 3B:
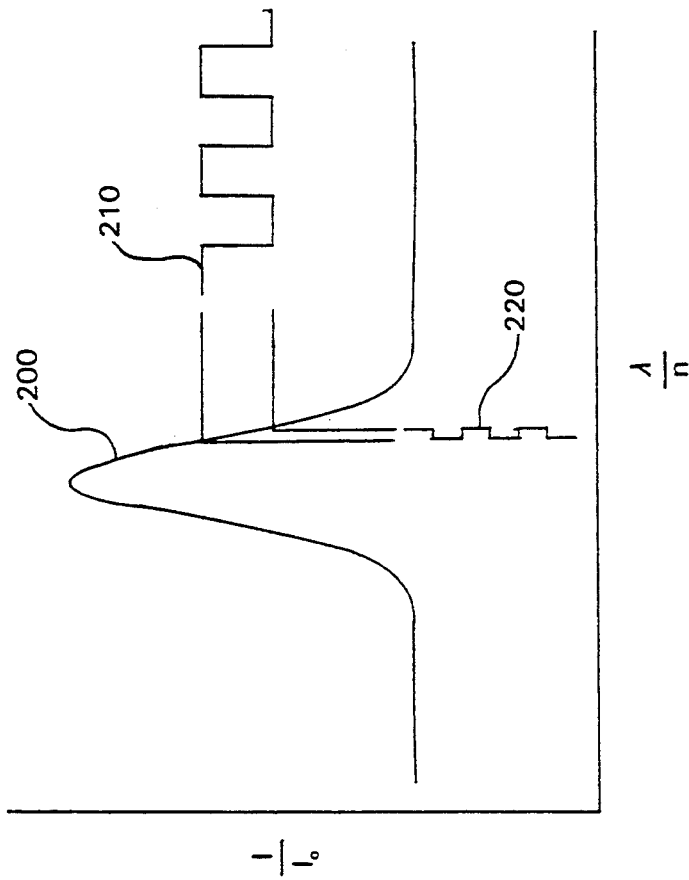
FIG. 3B shows the transmitted intensity as a function of λ/n, and the effect of refractive index modulation on intensity.
Figure 3A:
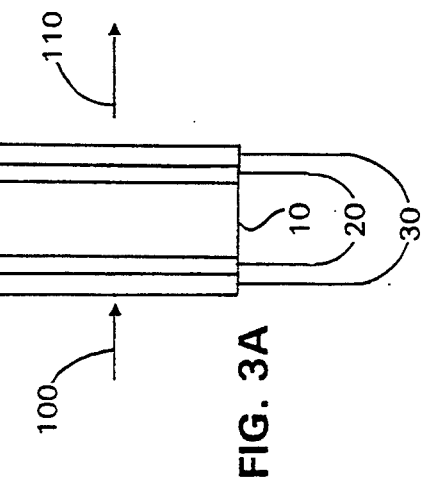
FIG. 3A shows a liquid crystal linear electro-optic modulator within a Fabry-Perot cavity.

Thus for polychromatic light, the transmission spectrum of the device of FIG. 3A is a series of m peaks for the wavelengths which satisfy the resonance condition. FIG. 3B shows one of these transmission peaks 200. Tuning the refractive index with the application of field $E_j$ tunes the transmitted wavelengths. In this embodiment the modulator of this invention is a tunable filter. The tuning range is $\Delta\lambda = (\lambda/n)\Delta n$, where $\Delta n$ can be obtained from Eq. 2.

When the incident light is monochromatic, the intensity of the transmitted beam is a function of applied voltage V and is electrically controllable. FIG. 3B illustrates the modulation in output intensity 210 with EO modulation of the refractive index 220. The Fabry-Perot resonator can be properly designed such that the transmission function is at its steepest slope for the input wavelength in the absence of the modulation voltage, as illustrated in FIG. 3B. This can be achieved through appropriate choice of l or by using a bias voltage to tilt the liquid crystal molecules and select n.

The Fabry-Perot device can also be operated in reflection mode. In this embodiment, one of the reflective surfaces 30 has $R \approx 1$ and the output beam overlaps the input beam. In the reflection mode configuration all wavelengths, resonant and otherwise, exit colinearly. Therefore, the device is a phase modulator enhanced by multiple passes, in contrast with the amplitude modulator or tunable filter of the transmission mode embodiment.

Because of the sharp transmission function of the Fabry-Perot resonator when provided with high finesse, the transmitted intensity is strongly modulated with a relatively small modulating voltage. Using typical values for $n_z=1.65$, $l=5$ μm, and $R=0.9$ and assuming $r_{32}=1$ pm/V, the modulation depth obtained is $$\left(\frac{dT}{dV}\right)_{max} = 2.75 \times 10^{-4} \, V^{-1}, \quad (7)$$

where the maximum refers to the modulation depth at the steepest slope of the transmission spectrum. This modulation depth is an order of magnitude greater than the single pass phase-retardation embodiment of FIG. 2.

Multiple passes may also be achieved in a waveguide structure. In this embodiment, the EO device of FIG. 2 is sandwiched between cladding layers with lower refractive indices. The input light can be coupled into and out of the ends of the waveguide or the sides. End coupling can be performed, for example, with a focused beam or a fiber optic input. Side-coupling can be performed, for example, by gratings (T. Tamir in *Topics in Appl. Phys.* 7, *Integrated Optics*, edited by T. Tamir, Springer-Verlag, New York, 1979, p. 83) or by prisms (Tien, op. cit.). These side-coupling techniques are functionally equivalent and the prism is used for illustration. The prism-coupled waveguide embodiment of the present invention is shown in FIG. 4A. The guiding layer 10 is a liquid crystal EO modulator with index $n_g$. On at least two sides are cladding layers 40 of low refractive index material of index $n_c$ where $n_c<n_g$. Electrodes 20 apply a voltage 26 which includes the modulating voltage $V_j$ and can include the optional bias voltage $V_B$. The electrodes can alternatively be placed in a lateral direction. Prism 50 with index $n_p>n_g$ abuts the thin-film waveguide. Prism 50 comprises coupling-in prism 52 with base angle $\Theta_B$ and coupling-out prism 54. A second prism 50 can be placed on the opposite side of the waveguide including coupling-out prism 56. Input beam 100 can be polarized by optional polarizing element 72 and focused by optional focusing means 74. The output can be sensed, for example, by sensing element 76.

When the components of the wave vectors parallel to the gap are equal for both the waves in the prism and in the film, the coupling reaches its peak and the light is efficiently coupled into the thin film. If the wave vectors are different, the net coupling is, in general, very small. The coupling is a function of input angle $\Theta_p$ and the refractive indices of the waveguide layer and the prism. For propagation in the waveguide, the summed round trip phase delay must equal an integral number $m$ of cycles, $2m\pi$. The optical waveguide can support $m$ modes, with phase velocities $v_m$. The waveguide propagation constant is $\beta_m=\omega/v_m$ where $\omega$ is the angular frequency of the waveguide mode. Therefore the coupling condition is $$kn_p \sin \theta_p = Kn_g \sin \theta_g = \beta \quad (8)$$

where $\Theta_p$ is the angle of the beam in the prism and $\Theta_g$ is the angle the guided beam, both with respect to the substrate normal. When Eq. 8 is satisfied coupling becomes effective, and optical energy can be transferred from the prism to the film and back from the film to the prism.

FIG. 4A shows the propagation of a waveguide mode 105. Two series of m-lines, the "reflected" lines 112, and the "transmitted" lines 114, are output by the device of this embodiment. Each of the lines is due to a waveguide mode of a different order m. The order m is determined by the thickness of the waveguide.

With thick cladding layers, weak coupling (sharp mode profile) occurs between the prism and the thin-film waveguide. This allows the mode equations to be expressed by the transcendental equation (Tien, op. cit.), $$[(kn_g)^2 - \beta^2]^{\frac{1}{2}}h - 2\arctan\left[\frac{[\beta^2 - (kn_c)^2]^{\frac{1}{2}}}{[(kn_g)^2 - \beta^2]^{\frac{1}{2}}}\right] = m\pi, \quad (9)$$

With the index of refraction of the guiding layer, $n_g$ modulated by the electric field, we have $$n'_g = n_g \pm \Delta n(E) \quad (10)$$

where $\Delta n(E)$ is the modulated index of refraction and is dependent upon the applied electric field. Substitute Eq. 10 into Eq. 9, we have a mode equation modulated by the electric field.

The modulation of $n_g$ in the z direction (perpendicular to the electrodes) by the linear EO effect is given by $n_z$ in Eq. 2. Substituting Eq. 2 into Eq. 9 gives the mode equation $$f(V,\beta) = \left(\left(k\left(n_z - \frac{n_z^3 r_{32} V}{2l}\right)\right)^2 - \beta^2\right)^{\frac{1}{2}}h - \quad (11)$$

$$2\arctan\left\{\frac{[\beta^2 - (kn_c)^2]^{\frac{1}{2}}}{\left[\left(k\left(n_z - \frac{n_z^3 r_{32} V}{2l}\right)\right)^2 - \beta^2\right]^{\frac{1}{2}}}\right\} = m\pi$$

Because the propagation constant $\beta$ is related to the incident angle by Eq. 8, a fluctuation of $\Delta\beta$ which is introduced by the perturbation of the refractive index will change the coupling angle of the prism module, $\Delta\Theta_p$. Conversely, for a fixed angle of incidence $\Theta_p$, modulation of $n_g$ determines whether the beam will be coupled into the waveguide or reflected at the prism-waveguide interface. Thus, for monochromatic light at a fixed angle of incidence the device of FIG. 4A is an intensity modulator.

Figure 4B:
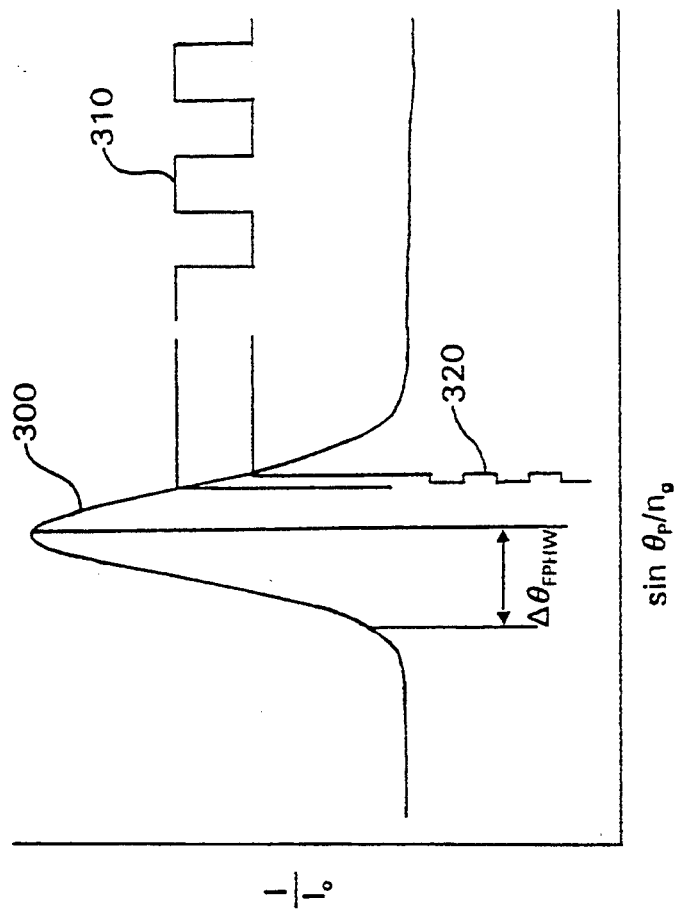
FIG. 4B depicts the transmitted intensity of one of these orders at a fixed observation point as a function of $\sin\Theta_p/n_g$, and the effect of refractive index modulation on intensity.
Figure 4A:
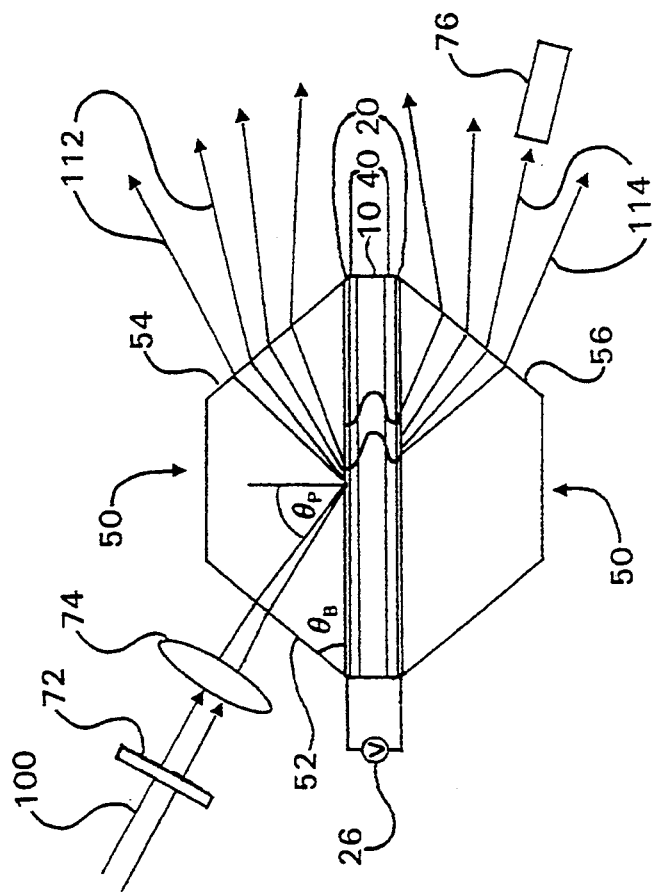
FIG. 4A illustrates a liquid crystal linear electro-optic modulator within a prism-coupled waveguide of order m.

FIG. 4B shows a waveguide mode intensity profile 300 as a function of $\sin \Theta_p/n_g$. The half-width of the waveguide mode is $\Delta\Theta_{FPHW}$ (full power, half-width). Electro-optic tuning of $n_g$ 320 modulates the output intensity 310. The amount of change, $\Delta\Theta_p$, with respect to $\Delta V$ is calculated with $n_p=1.72309$ (Scott SF10 glass at $\lambda=0.6328$ μm) and the base angle of the prism $\Theta_B=60°$. Using typical values $n_g=n_{CSLC}=1.65$, polyvinylalcohol (PVA) cladding layer with $n_c=1.515$, $r_{32}=1$ pm/V, guiding layer thickness $l=1.5$ μm and cladding layer thickness $S=1$ μm gives $$\frac{\Delta(\theta_p/\Delta\theta_{FPHW})}{\Delta V} \simeq 10^{-3} \, V^{-1} \quad (12)$$

for the modulation depth, which is about one order of magnitude more sensitive than the Fabry-Perot electro-optic modulator method.

In waveguides with increased cladding layer thickness, there is a trade-off between decreased coupling strength and sharper resonances. In the waveguide embodiment of this invention the cladding layer thickness can be smaller at the light input location for increased coupling and larger in the guiding portion for better confinement.

Figure 5:
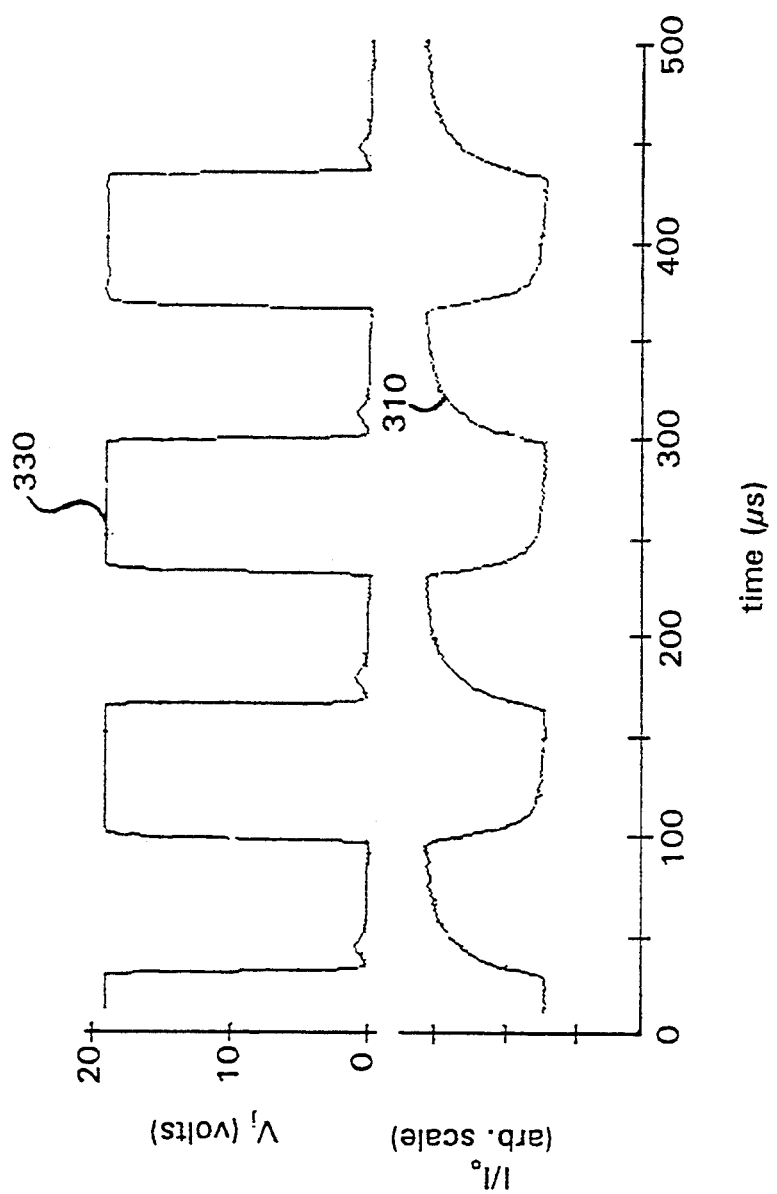
FIG. 5 shows the measured modulation in output intensity (bottom curve) with modulation of applied voltage (top curve) for a prism-coupled liquid crystal waveguide.

FIG. 5 demonstrates intensity modulation by the prism-coupled waveguide embodiment of this invention. Two high index prisms were coated with indium-tin-oxide (ITO) transparent electrodes. A thin PVA layer which acts as both an aligning layer and a cladding medium, was spun on top of the ITO. A BDH SCE9 layer was used for the guiding layer. Modulation of the applied voltage 330 at 6 kHz produced modulation of the output intensity 310.

Using BDH SCE9, electro-optic frequency response has been measured up to 20 MHz, the highest modulation speed achieved in CSLCs to date. The limitation is due to the complex impedance mismatch between the electric field driver and the prism-waveguide cell. However, with impedance matched electrodes (e.g. transmission line electrodes) GHz modulation can be achieved.

Figure 6:
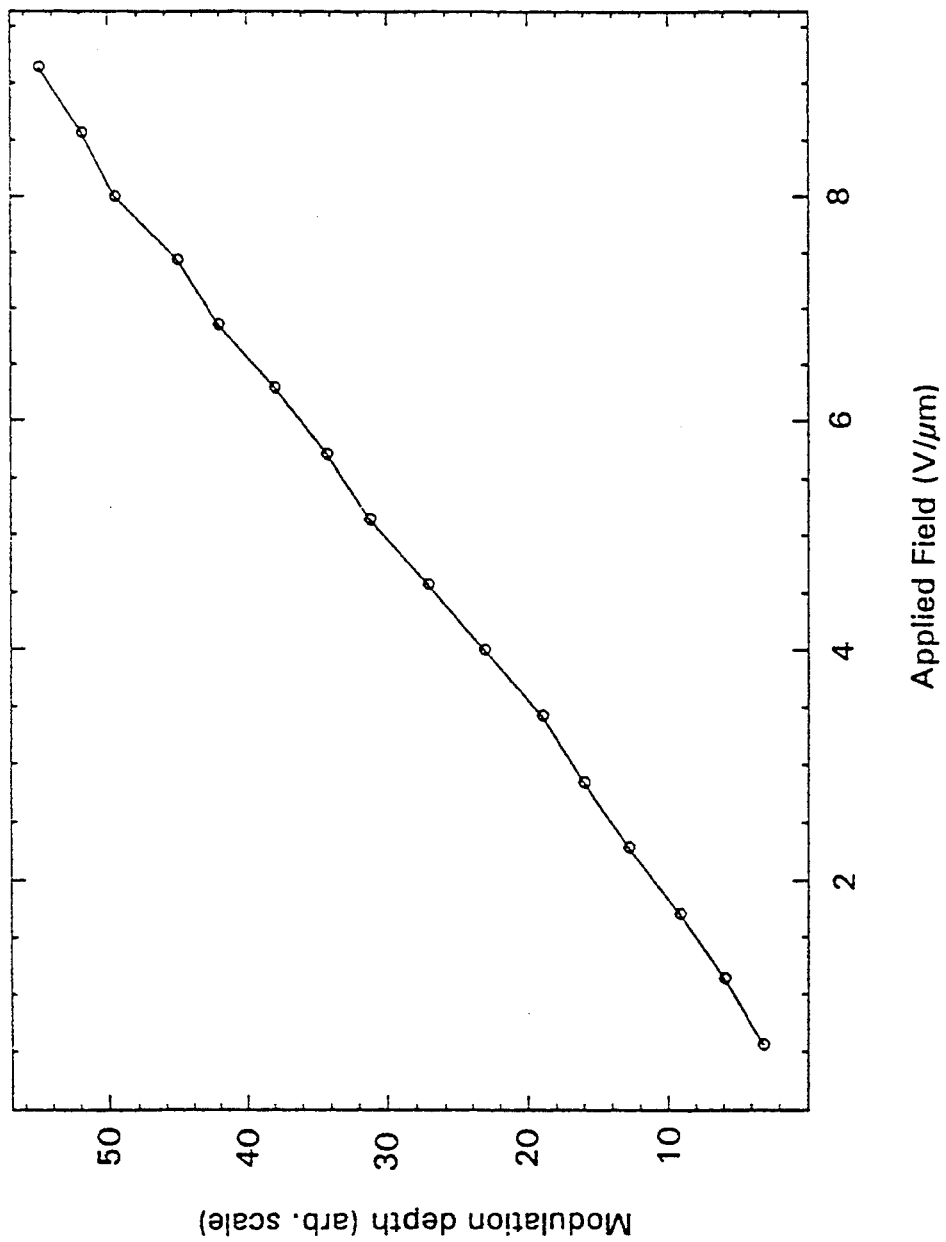
FIG. 6 shows the measured modulation depth of a prism-coupled liquid crystal waveguide as a function of applied modulation field.

FIG. 6 shows the modulation depth of the CSLC waveguide modulator as a function of applied field. The linear relationship demonstrates that the modulator utilizes linear electro-optic effect.

Another embodiment of this prism-waveguide module is a high speed optical tunable filter. With a modulation of $n_g$, the coupling condition (Eq. 8) can be satisfied by a corresponding change in $\lambda$ (recall $k = 2\pi/\lambda$). Thus for polychromatic input light, the wavelength which meets the coupling condition for a given $n_g$ is coupled into the prism and other wavelengths are reflected. The tuning range of this device is calculated from the derivative of Eq. 11 with respect to $\lambda$ and $n_g$ to give $$\Delta\lambda = \left[ 1 + \frac{\sqrt{n_p^2 - n_c^2}}{n_g^2 - n_c^2} \frac{\lambda}{\pi h} \right] \frac{n_g \lambda}{n_g^2 - n_p^2} \Delta n_g. \tag{13}$$

When $n_c - n_p$ is small, the tuning range is expected to be very large, even with a small perturbation of the index of refraction of the guiding material. For example, with $\lambda = 1.55$ μm, $n_g = 1.65$, $n_c = 1.5$, $n_p = 1.65$ and $h = 1.5$ μm, the calculated optical tuning range is 220 nm for $\Delta n_g = 0.01$.

Figure 7:
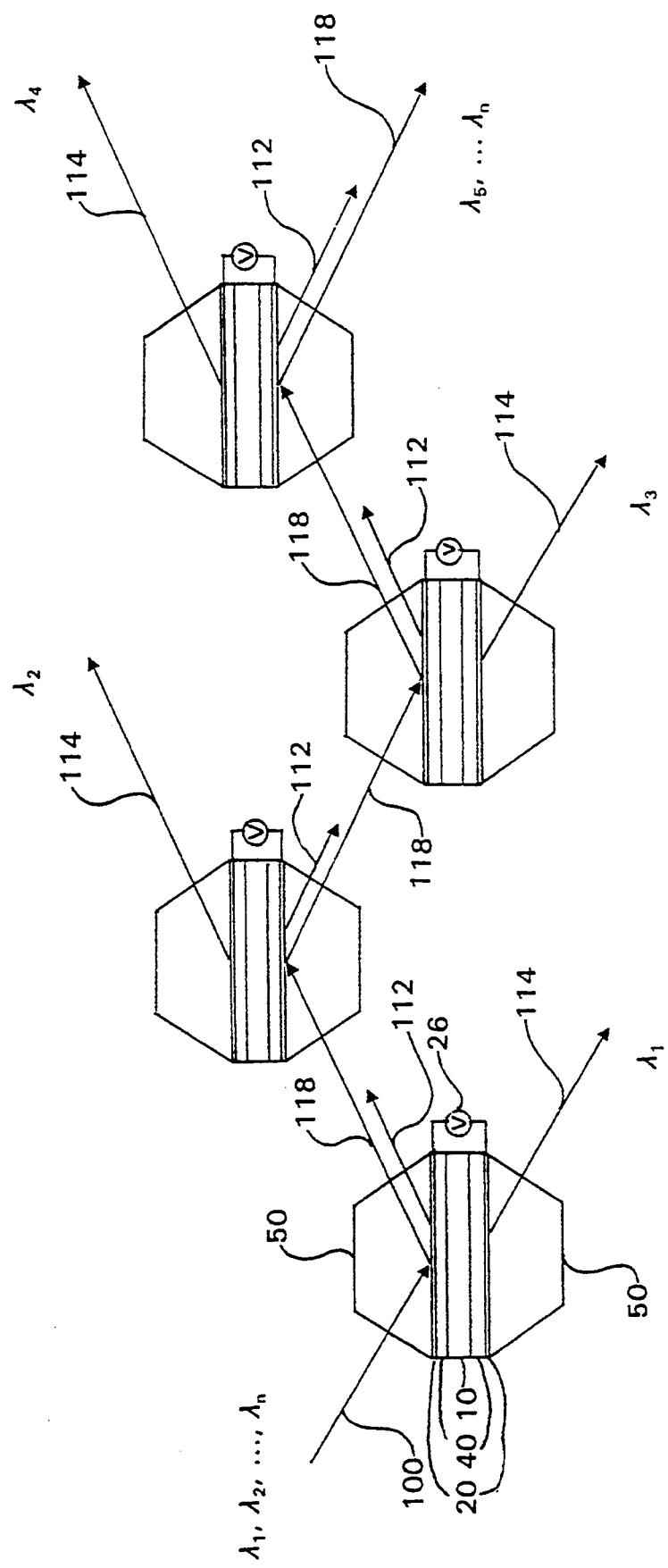
FIG. 7 illustrates a cascade of prism-coupled waveguide modulators with polychromatic input light.

The prism-coupled waveguide tunable filter of this invention can be cascaded in series as shown in FIG. 7. In this and the following figure, the refraction of light at the prism-air interface is not depicted. Polychromatic light 100 is input into the first filter. The refractive index of the guiding layer is chosen to couple out light 112 and 114 of wavelength $\lambda_1$ and reflect the other wavelengths 118 into a second stage, which selects a second wavelength. This provides simultaneous multichannel operation without needing to divide the incident beam for each channel. This cascaded filter embodiment can use any kind of electro-optic tuning method to choose $n_g$ for each filter stage. In combination with wavelength selection, the intensity of each channel can be rapidly modulated by the linear electro-optic effect.

This invention provides several embodiments of the prism-coupled waveguide modulator as shown in FIG. 8. They differ in the mechanism of coupling light in and out of the waveguide. The waveguide consists of guiding layer 10, cladding layer 40, electrodes 20, and substrates 60 of refractive index $n_S$. The devices with side couplers include prisms 52 and 54. The substrate may also serve as a cladding layer in lieu of the separate layer 40, in which case the refractive indices are in the order $n_P > n_g > n_S$, $n_c$.

Figure 8A:
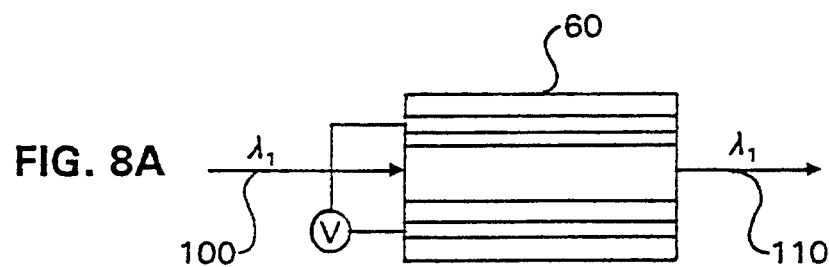
FIG. 8, comprised of FIGS. 8A–8H, shows a waveguide electro-optic modulator with various combinations of end- and side-coupling and with monochromatic or polychromatic input light.

The device of FIG. 8A employs end coupling for both the input light 100 and output light 110. With opto-electronic modulation of the refractive index, it functions as a phase and polarization modulator for monochromatic light or polychromatic light (FIG. 8E).

Figure 8B:
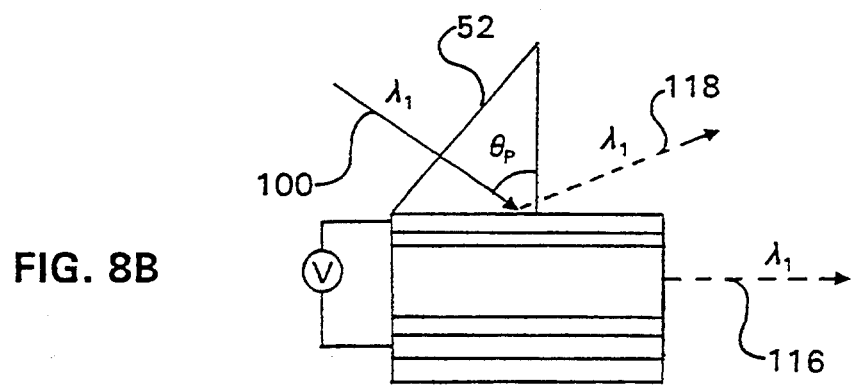
Figure 8C:
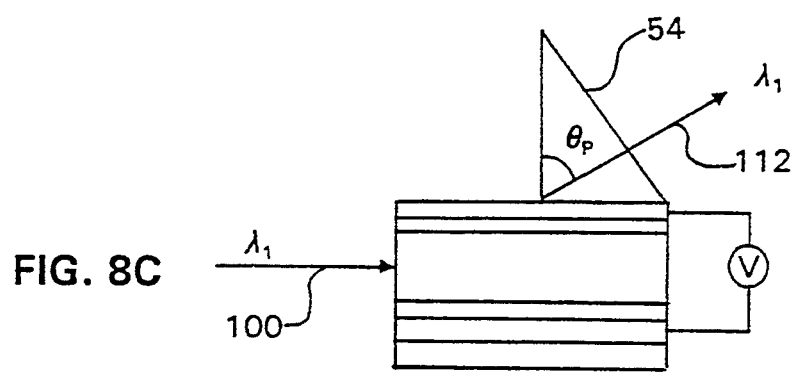

In the device of FIG. 8B the input light is prism-coupled 52 and the output is end coupled. As the refractive index of the guiding layer is modulated, the light 100 is either reflected from the waveguide 118 or coupled into the waveguide and transmitted out the end 116. The dotted lines 116 and 118 indicate that, depending on the refractive index of the guiding layer, one or the other of these beams is present. This device is therefore an intensity modulator and the light is switched between two outputs. For polychromatic light (FIG. 8F), modulation of the refractive index changes the coupling condition and tunes which wavelength is coupled into the waveguide and transmitted out the end 116 and which is reflected 118. It is therefore a tunable transmission filter at beam 116 and a notch filter at beam 118.

When the output of the waveguide is prism-coupled 54 (FIG. 8C), modulating the index of refraction changes the angle at which the coupling condition is satisfied. Input light 100 is output 112 through the prism at angle $\Theta_P$. This device can be used as a beam deflector or, from a fixed observation angle, as an intensity modulator for monochromatic light. For polychromatic light (FIG. 8G), the output angle of each wavelength varies with the refractive index. From a fixed observation angle this device is therefore a tunable filter.

Figure 8D:
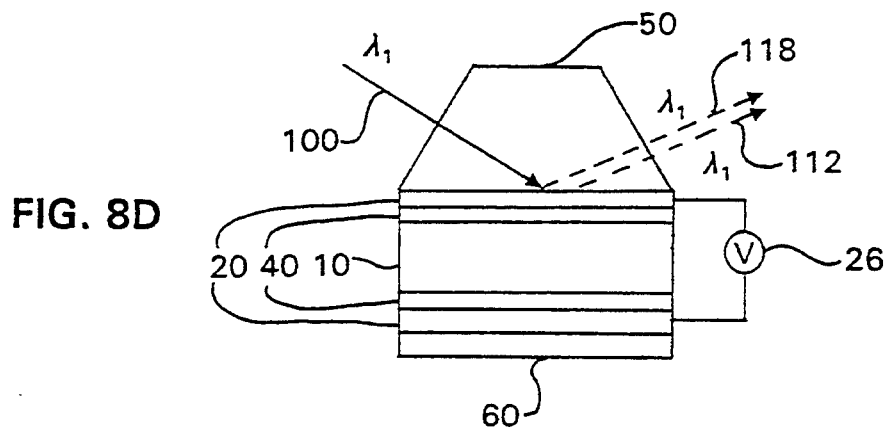
Figure 8E:
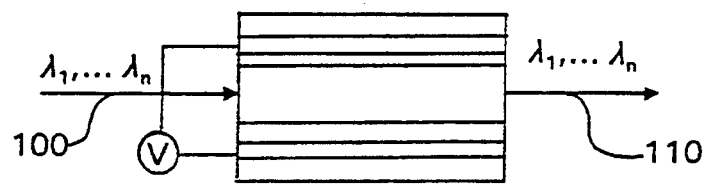
Figure 8F:
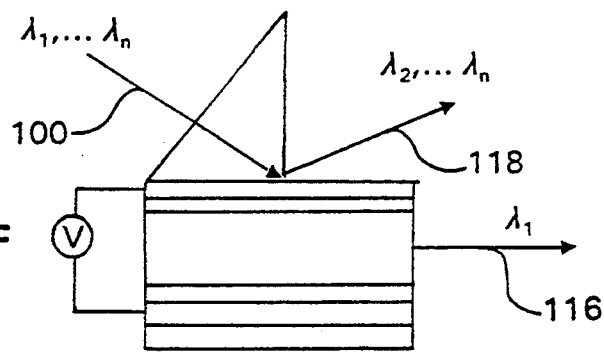
Figure 8G:
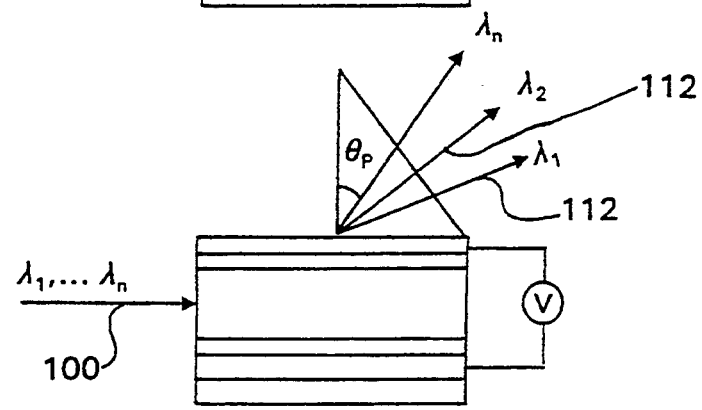
Figure 8H:
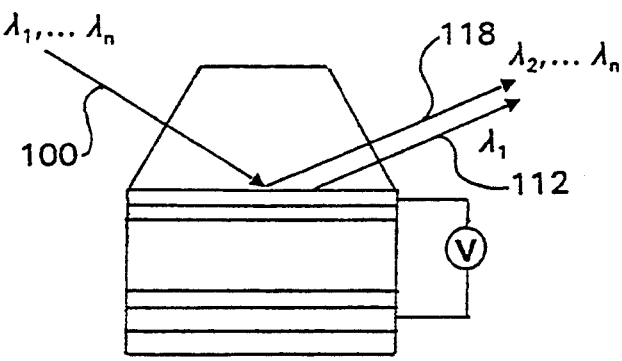

In the device of FIG. 8D prism-couplers are employed at both the input 52 and output 54. The input beam 100 is either reflected from the waveguide 118 or coupled in and then coupled out again 112. The intensity is modulated between the reflected and coupled beams with modulation of the refractive index. For polychromatic light (FIG. 8H) the device modulates which wavelength is coupled in and which wavelengths are reflected, thereby providing a tunable filter. A second output coupling prism 56 can be placed on the opposite side of the waveguide to provide beams in the transmission direction, as illustrated in FIG. 4A for monochromatic light and in FIG. 7 for polychromatic light.

The liquid crystal modulators of the present invention can utilize the linear electro-optic effect alone. They can also simultaneously utilize the Goldstone or soft dielectric modes which produce refractive index changes via reorientation of the molecular director. These modes provide a larger range of refractive index tuning but at a lower speed. For example, the amplitude modulator can utilize periodic changes in the molecular orientation as a carrier sub-frequency for the high speed linear electro-optic modulation. As another example, the tunable filter can use the molecular reorientation to select one of a plurality of wavelengths and the linear EO effect to modulate the intensity of each wavelength. In addition, CSLCs have been successfully oriented on many substrates, including GaAs and Si, which provides a potential for numerous hybrid structures with other optical or electronic elements.

Liquid crystal materials have a number of advantages over other materials for use in the linear electro-optic waveguide modulator. Because their refractive indices are around 1.5, compared with much higher values for inorganic crystals, it is easier to fabricate cladding layers with a similar refractive index. Poly-vinyl-alcohol, poly-butyl-thalate (PBT), Nylon, and SiO are examples of suitable materials. Molecular tailoring of liquid crystals can be employed to match the index with the cladding layer. Molecular tailoring can also produce molecules with increased nonlinear optical response.

The thickness of liquid crystal cells can be readily chosen to select the order of the waveguide. Depending on the application, the order is chosen to provide one output beam or multiple output beams. Single order waveguides can be fabricated with liquid crystals of about 1 μm thickness. Higher order waveguides require thicker cells. Because the linear electro-optic effect does not necessarily involve motion of the molecular director, a large bias field can be used to force the alignment of the liquid crystal molecules, and cell thickness is not limited by the requirement of surface-stabilized alignment.

If high output intensity is a requirement, a channel waveguide may be employed instead of the planar waveguide illustrated. A channel waveguide requires low index layers on all four sides of the guiding medium. This can be elegantly implemented in CSLCs in planar cells by using patterned electrodes to apply one voltage to a channel portion of the liquid crystal material and a second voltage on either side (J. Y. Liu, Ph.D. Thesis). This creates borders of lower index material on either side of a center strip and thus defines the second pair of sides of the waveguide channel. This CSLC waveguide structure can be electronically controlled and, because there are no physical boundaries between the liquid crystal guiding and cladding layers, the scattering is reduced.

This invention provides a modulator, as shown in FIGS. 2, 3, 4, 7, and 8, utilizing the linear electro-optic effect in liquid crystals. In addition it provides a prism-coupled waveguide tunable filter embodiment of the modulator (FIG. 7 and FIG. 8F–H) used with any electro-optic material and any electro-optic tuning process. The embodiments illustrated here are examples of this invention but do not impose limitations upon it. Other embodiments and applications will be readily apparent to those skilled in the art.

We claim:

1. An electro-optic modulator for modulating a characteristic of light, comprising a liquid crystal cell, said liquid crystal cell comprising:

a) liquid crystal material having a nonzero linear electro-optic coefficient $r_{ij}$, said liquid crystal material characterized by a molecular director having a tilt angle and an azimuthal angle;
b) means for applying an electric field $E_j$ to said liquid crystal material; and
c) means for restricting change in the tilt angle and azimuthal angle of the molecular director of said liquid crystal material in response to said electric field $E_j$;
d) wherein application of said electric field $E_j$ changes the refractive index of said liquid crystal material via the linear electro-optic effect.

2. The modulator of claim 1 wherein said means for restricting change in the molecular director comprises switching said electric field $E_j$ at a frequency greater than the tilt angle and azimuthal angle response times of said liquid crystal material.

3. The modulator of claim 1 wherein said means for restricting change in the molecular director comprises application of a bias field $E_B$ to said liquid crystal material.

4. The modulator of claim 1 wherein said modulator further comprises a Fabry-Perot cavity disposed about said liquid crystal material, said Fabry-Perot cavity comprising two reflective surfaces with reflectivities less than or equal to one.

5. The modulator of claim 1 wherein said modulator further includes a waveguide means for providing multiple passes for light through said liquid crystal material, and means for coupling light into and means for coupling light out of said waveguide means.

6. The modulator of claim 5 wherein said means for coupling light into and said means for coupling light out of said waveguide means comprise end-coupling means.

7. The modulator of claim 5 wherein at least one of said means for coupling light is a side-coupling means.

8. The modulator of claim 5 wherein said means for coupling light into and said means for coupling light out of said waveguide means comprise side-coupling prisms.

9. The modulator of claim 8 wherein said means for coupling light out of said waveguide means comprises two side-coupling prisms positioned on opposite sides of said waveguide means.

10. The modulator of claim 8 wherein said light is monochromatic and said characteristic of light is the output intensity at a fixed angle of observation.

11. The modulator of claim 1 wherein said liquid crystal material is a chiral smectic C* liquid crystal.

12. The modulator of claim 1 further including means for tilting said liquid crystal material to provide said nonzero linear electro-optic coefficients.

13. The modulator of claim 1 further including means for modulating said tilt angle or said azimuthal angle.

* * * * *